United States Patent [19]
Lee

[11] Patent Number: 5,356,497
[45] Date of Patent: Oct. 18, 1994

[54] METHOD FOR FORMING A SHEET MATERIAL PERMEABLE TO GAS AND NOT PERMEABLE TO WATER

[76] Inventor: Chi S. Lee, No. 396, Chung Shan Rd., Ching Shui Chen, Taichung Hsien, Taiwan

[21] Appl. No.: 57,154

[22] Filed: May 5, 1993

[51] Int. Cl.⁵ .................. B29C 59/10; B29C 65/52
[52] U.S. Cl. .................... 156/87; 156/231; 156/244.18; 156/253; 156/272.6; 156/274.6; 156/295; 219/384; 264/22; 264/154; 264/171; 425/174.8 E; 425/290; 427/471; 427/540; 427/580; 427/243
[58] Field of Search .............. 264/22, 26, 171, 154, 264/288.8; 425/174.8 E, 290; 219/384; 156/87, 295, 231, 272.6, 244, 18, 253, 274.6; 427/471, 540, 580, 243

[56] References Cited
U.S. PATENT DOCUMENTS

| | | | |
|---|---|---|---|
| 2,513,838 | 7/1950 | Beall | 219/19 |
| 3,760,153 | 9/1973 | Davies et al. | 264/154 |
| 3,862,396 | 1/1975 | Machida et al. | 219/384 |
| 3,880,966 | 4/1975 | Zimmerman et al. | 264/156 |
| 4,194,041 | 3/1980 | Gore et al. | 264/127 |
| 4,534,994 | 8/1985 | Feld et al. | 219/384 |
| 4,777,338 | 10/1988 | Cross | 264/154 |
| 4,833,026 | 5/1989 | Kausch | 264/154 |
| 5,006,187 | 4/1991 | Cook et al. | 264/22 |
| 5,260,360 | 11/1993 | Mrozinski et al. | 524/95 |

*Primary Examiner*—Jeffery Thurlow
*Attorney, Agent, or Firm*—Welsh & Katz, Ltd.

[57] ABSTRACT

A method for forming a sheet material permeable to gas and not permeable to water includes forming the sheet material by hot pressing two materials together, and discharging static electricity to the sheet material in order to form a number of apertures in the sheet material. The apertures have a size smaller than that of water particles and larger than that of gas particles such that the sheet material is permeable to gas and not permeable to water.

5 Claims, 4 Drawing Sheets

METHOD FOR FORMING A SHEET MATERIAL PERMEABLE TO GAS AND NOT PERMEABLE TO WATER

BACKGROUND OF THE INVENTION

1. Field of the Invention

The present invention relates to a method, and more particularly to a method for forming a sheet material permeable to gas and not permeable to water.

2. Description of the Prior Art

Typical sheet materials generally comprise several types, one of which is made of fabric materials which is permeable both to air and fluid, the other type is made of waterproof materials which can be used for making shoes, raincoats, diving suits etc., still another type of sheet materials is provided for making bandages; when the users wear the shoes, raincoats or diving suits, and when the bandages are applied to the users, the heat of the body of the user can not be radiated outward through the sheet materials such that the users may feel uncomfortable.

The present invention has arisen to mitigate and/or obviate the afore-described disadvantages of the conventional sheet materials.

SUMMARY OF THE INVENTION

The primary objective of the present invention is to provide a method for forming a sheet material permeable to gas and not permeable to water, the heat may also permeate through the sheet material.

In accordance with one aspect of the invention, there is provided a method for forming a sheet material permeable to gas and not permeable to water comprising: preparing the sheet material, discharging static electricity to the sheet material in order to form a plurality of apertures in the sheet material, the apertures having a size smaller than that of water particles and larger than that of gas particles, whereby, the sheet material is permeable to gas and not permeable to water. An adhesive material may further be applied onto the sheet material such that the sheet material can be adhered onto any kind of objects.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
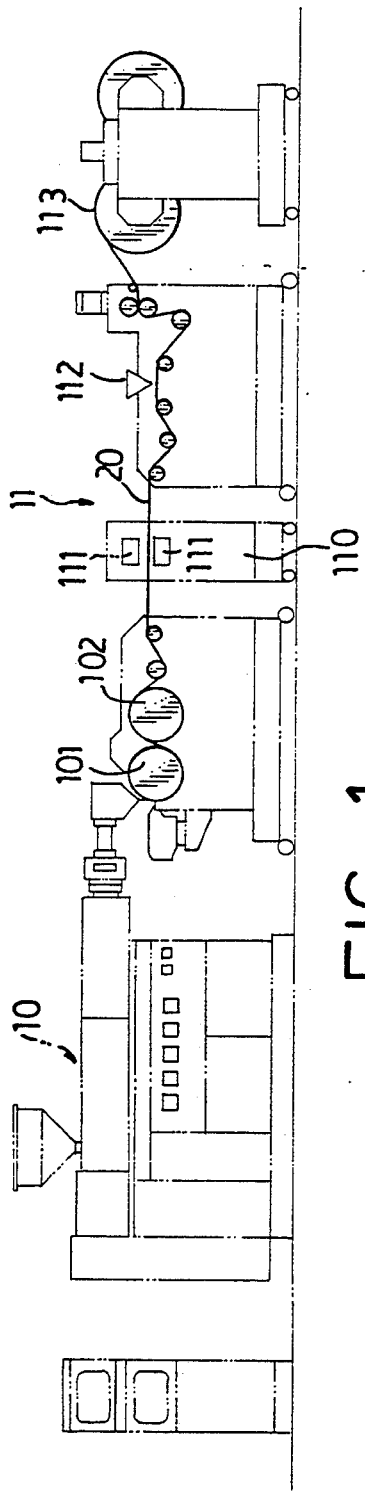
FIGS. 1 and 2 are schematic views illustrating the operating steps of a method in accordance with the present invention.
Figure 2:
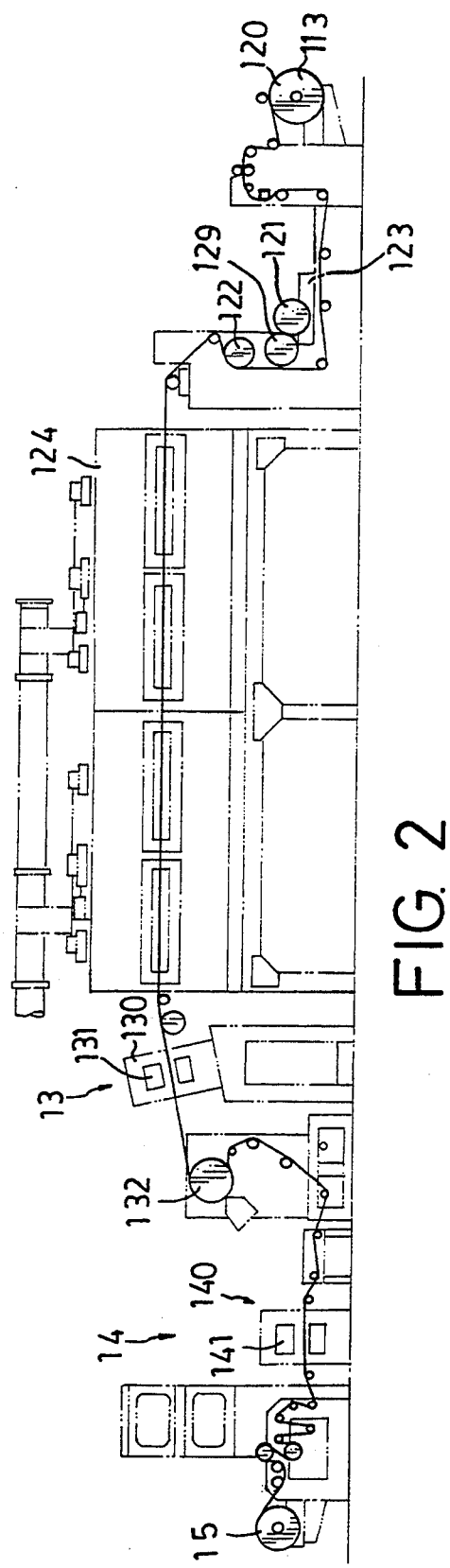
Figure 3:
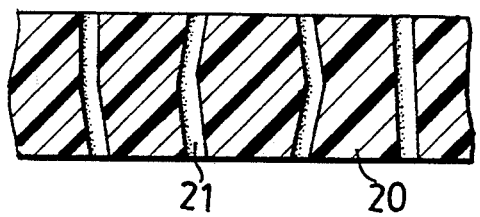
FIGS. 3, 4 and 5 are cross sectional views illustrating the sheet material under processing.

Referring to the drawings, and initially to FIGS. 1 to 3, a method in accordance with the present invention is provided to make a sheet material which is permeable to gas and not permeable to water. The size or the diameter of the water particle is about 100 $\mu$m when the water is in the form as mist, and is about 3000 $\mu$m for typical water drips; the diameter of a gas particle is about 0.0045 $\mu$m. Accordingly, a sheet material-including a plurality of apertures having a size larger than 0.0045 $\mu$m and smaller than 100 $\mu$m may be permeable to gas and not permeable to water.

The method in accordance with the present invention comprises preparing a sheet material 20 which is preferably comprised of 70% of polypropylene and 30% of nylon, the sheet material 20 is formed by an extruding machine 10 having a temperature up to 500° and is then moved through a knurl wheel 101 and a wheel 102 for cooling the sheet material 20, the sheet material 20 is then moved through a static discharge station 11 which includes a static discharge mechanism 110 having two electrodes 111 disposed above and below the sheet material 20 respectively for discharging static electricity into the sheet material 20; as shown in FIG. 3, a plurality of apertures 21 can thus be formed in the sheet material 20 and include a size ranging from 0.2 $\mu$m to 10 $\mu$m, an inspecting device 112, such as an electric eye is provided for inspecting the distribution of the apertures 21, and a spool 113 is provided for storing the sheet material 20, in which the sheet material 20 is wound on the the spool 113.

Figure 4:
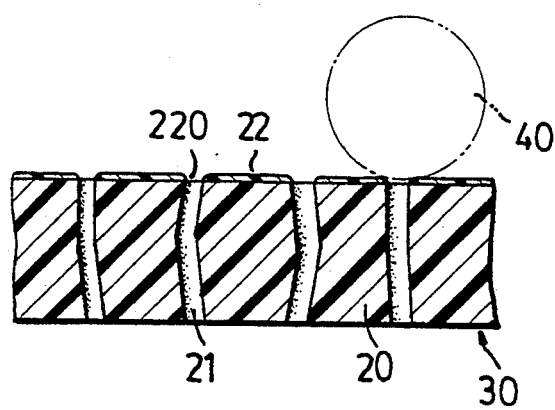

As shown in FIG. 2, a roller 121 has a lower portion immersed in a container 123 which contains waterproof covering materials, such as gelatinous substance, and another roller 129 is engaged with the roller 121 and arranged such that the covering material may be transferred from the roller 121 onto the roller 129, the sheet material 20 then moves over the roller 129 such that the covering material is transferred onto the upper surface of the sheet material 20, another roller 122 is provided to smooth the covering material such that a covering layer 22 is formed on the upper surface of the sheet material 20 so as to form a water resistant covering layer (FIG. 4). The sheet material 20 is then moved through an oven 124 having a temperature up to 120° C. in order to dry the covering material. It is to be noted that, at this moment, the apertures 21 are covered and enclosed by the covering layer 22, such that another static discharge station 13 is required to discharge static electricity onto the sheet material 20 in order to open the apertures 21. The static discharge station 13 includes a static discharge mechanism 130 having two electrodes 131 disposed above and below the sheet material 20 respectively for discharging static electricity onto the sheet material 20 such that a plurality of orifices 220 will be formed in the covering layer 22. It is to be noted that the orifices 220 may not be exactly aligned with the apertures 21 such that part of the apertures 21 will be opened and part of them will not be opened.

The sheet material 20 is then moved through a roller 132 for cooling the sheet material 20 and preferably moved through another static discharge station 14 in order to discharge static electricity onto the sheet material 20 and the covering layer 22 in order to form more orifices 220 in the covering layer 22. The static discharge station 14 includes a static discharge mechanism 140 having two electrodes 141 disposed above and below the sheet material 20 respectively for discharging static electricity onto the sheet material 20 and the covering layer 22 such that a plurality of orifices 220 and apertures 21 will further be formed in the covering layer 22 and the sheet material 20 respectively. The sheet material 20 is then wound on a spool 15.

As shown in FIG. 4, the apertures 21 and the orifices 220 include a size ranges from 0.2 μm to 10 μm, however, the smallest size of the water particle 40 is around 100 μm such that the water particle 40 may not pass through the apertures 21 and the orifices 220. The covering layer 22 forms a water resistant covering layer.

Figure 5:
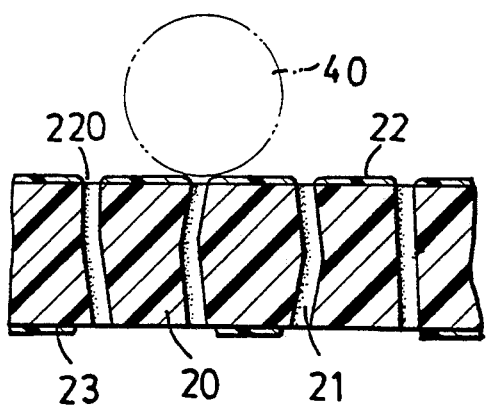
Figure 6:
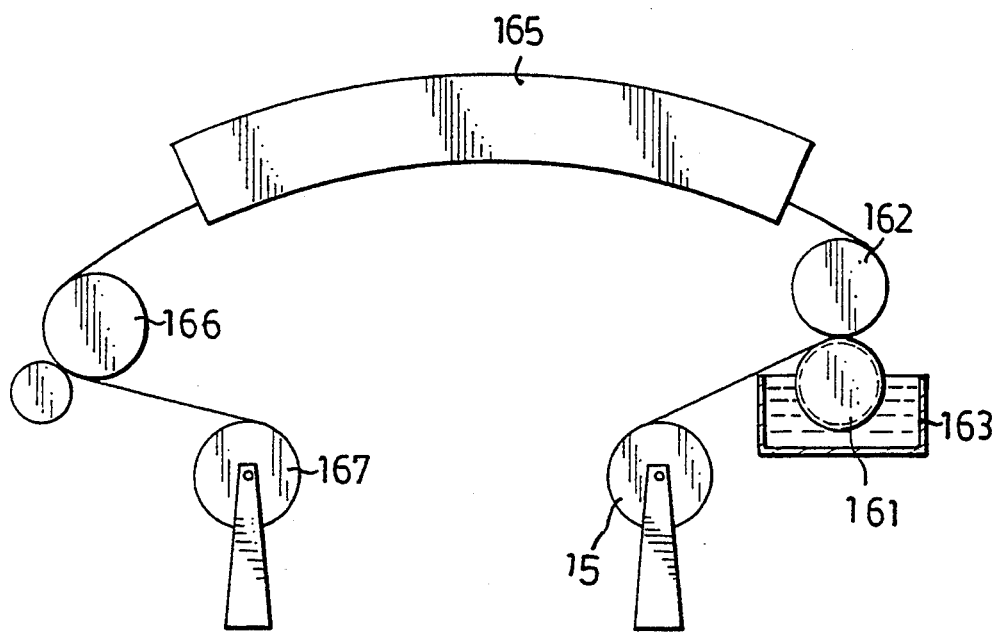
FIG. 6 is a schematic view illustrating the adhesive material applying process.
Figure 7:
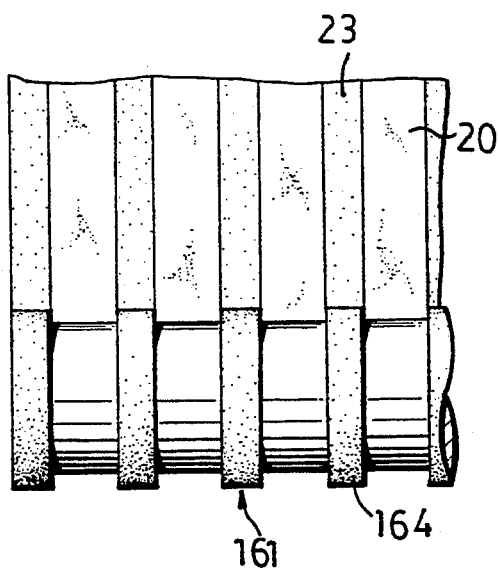
FIG. 7 is a partial plane view illustrating the adhesive material applying process.

Referring next to FIGS. 6 to 7, the sheet material 20 unwound from the spool 15 may further be moved through a pair of rollers 161, 162, in which the roller 161 has a lower portion immersed in a container 163 which contains adhesive materials and the roller 161 includes an outer peripheral surface 164 contacted with the lower surface of the sheet material 20, such that, as shown in FIG. 7, a plurality strips of adhesive materials 23 are applied onto the lower surface of the sheet material 20, best shown in FIG. 5. After moving through the rollers 161, 162, the sheet material 20 moves through an oven 165 for drying the adhesive material 23, and moves through another roller 166 and is then wound on a spool 167 for storing purposes; whereby, the sheet material as shown in FIG. 5 can be formed and can be adhered onto any object.

Figure 8:
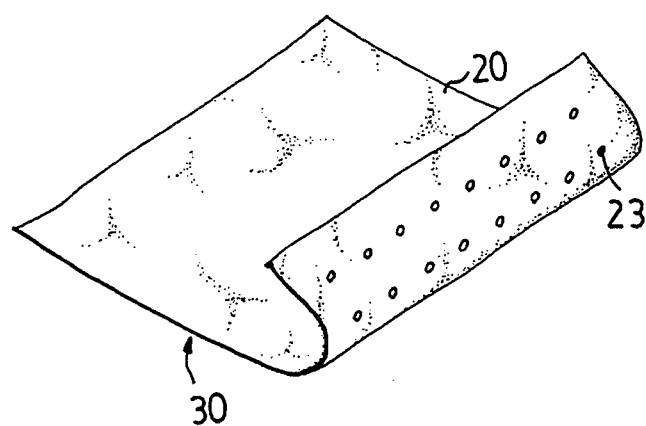
FIG. 8 is a perspective view illustrating a sheet material made by the method in accordance with the present invention.

Referring next to FIG. 8, it is to be noted that the adhesive material 23 can also be applied onto the sheet material 20 as the type of a plurality of spots or points.

Accordingly, a sheet material permeable to gas and not permeable to water can be easily manufactured by the method in accordance with the present invention, the heat may also permeate through the sheet material.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for forming a sheet material which is made of 70% of polypropylene and 30% of nylon and is permeable to gas and not permeable to water, said sheet material having an upper surface and a lower surface, said method comprising:

applying a first static discharge mechanism having two electrodes respectively disposed at adjacent opposite sides of said sheet material for discharging static electricity to said sheet material in order to form a plurality of apertures therein, each of said apertures having a size ranging from 0.2 μm to 10 μm and smaller than that of water particles and larger than that of gas particles such that said sheet material is permeable to gas and not permeable to water;

applying a water-resistant gelatinous substance onto the upper surface of said sheet material so as to form a water-resistant covering layer on said sheet material; and applying a second static discharge mechanism having two electrodes respectively disposed at adjacent opposite sides of said sheet material for discharging static electricity to said sheet material in order to form a plurality of orifices in said covering layer, each of said orifices having a size ranging from 0.2 μm to 10 μm.

2. A method according to claim 1, wherein said water resistant gelatinous substance is made of silicon materials.

3. A method according to claim 1 further comprising applying a plurality strips of adhesive material to said lower surface of said sheet material.

4. A method according to claim 1 further comprising applying a plurality spots of adhesive material to said lower surface of said sheet material.

5. A method according to claim 1 further comprising a container for accommodating said water-resistant gelatinous substance, a first roller having a lower portion immersed in said container for being deposited with said gelatinous substance, a second roller having an outer peripheral surface in contact with said first roller such that said gelatinous substance is transferred to said second roller, said sheet material being moved over said second roller such that said gelatinous substance is deposited onto said upper surface of said sheet material.

* * * * *